(12) United States Patent
Bernasconi et al.

(10) Patent No.: US 6,901,178 B2
(45) Date of Patent: May 31, 2005

(54) FAST TUNABLE OPTICAL FILTER

(75) Inventors: Pietro Arturo Bernasconi, Eatontown, NJ (US); Dries Van Thourhout, Holmdel, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 207 days.

(21) Appl. No.: 10/295,792

(22) Filed: Nov. 15, 2002

(65) Prior Publication Data

US 2004/0096154 A1 May 20, 2004

(51) Int. Cl.[7] .............................................. G02B 6/35
(52) U.S. Cl. ...................... 385/17; 385/24; 385/140
(58) Field of Search ......................... 385/24, 140, 17; 398/82, 85

(56) References Cited

U.S. PATENT DOCUMENTS

| | | | |
|---|---|---|---|
| 5,136,671 A | 8/1992 | Dragone | 385/46 |
| 5,488,500 A | * 1/1996 | Glance | 398/85 |
| 5,543,010 A | 8/1996 | Keng | 156/285 |
| 5,675,592 A | 10/1997 | Dragone et al. | 372/20 |
| 5,701,371 A | * 12/1997 | Ishida | 385/17 |
| 6,222,964 B1 | 4/2001 | Sadot et al. | 385/40 |
| 6,243,402 B1 | 6/2001 | Doerr | 372/20 |
| 6,359,912 B1 | 3/2002 | Doerr et al. | 372/4 |
| 6,381,383 B1 | 4/2002 | Bernasconi et al. | 385/24 |
| 6,411,756 B2 | 6/2002 | Sadot et al. | 385/40 |
| 6,584,244 B2 | * 6/2003 | Hung | 385/24 |

OTHER PUBLICATIONS

"Monolithically Integrated 64–Channel WDM Channel Selector With Novel Configuration", N. Kikuchi, Electronics Letters, Mar. 28, 2002, vol. 38, No. 7, pp. 331–332.

"Novel Geometry For An Integrated Channel Selector", D. Van Thourhout et al., Journal of Selected Topics in Quantum Electronics.

"Sixteen–Channel Wavelength Selector Monolithically Integrated on InP", R. Mestric et al., TuF6–1–3, pp. 81–83.

* cited by examiner

*Primary Examiner*—Akm Enayet Ullah
*Assistant Examiner*—Jerry T Rahll

(57) ABSTRACT

A fast tunable optical filter with unique selection means, capable of being monolithically integrated on silica or semiconductive wafers, includes a frequency routing device (FRD) for receiving up to P input optical signals and responsively providing up to Q outputs, where P and Q are integers greater than or equal to one, at least one input selecting device for selectively coupling up to P optical signals to the FRD, and at least one output selecting device for selectively inhibiting up to Q outputs of said FRD.

27 Claims, 5 Drawing Sheets

300

FAST TUNABLE OPTICAL FILTER

FIELD OF THE INVENTION

This invention relates to the field of optical filters and, more specifically, to fast tunable optical filters.

BACKGROUND OF THE INVENTION

High-speed data communications systems need to support the aggregate bandwidth requirements of current and future applications such as telecommunication technology, supercomputer interconnection, high-quality video conferencing and multimedia traffic. There is a general consensus that these bandwidth requirements can most easily be attained by using optical transmission technologies. Dense optical wavelength division multiplexing (WDM) appears to be the hardware backbone for such networks. Dense optical WDM is a method of multiplexing a large number of optical data channels on a wavelength basis (e.g., each divided wavelength region is regarded as a different channel and is routed and manipulated separately from all other divided wavelength regions).

Dense WDM requires advanced optoelectronic components and subsystems capable of handling the extremely high aggregate bit rates and traffic levels demanded by modern optical data communications systems. One very critical component needed for the implementation of WDM packet-switched systems is a tunable filter. A tunable filter is used to extract one or a subset of optical channels from the multitude of optical channels entering the filter. The subset of extracted channels can be varied in time by dynamically modifying the filter configuration Some common optical filters are based on classical interferometers, and include Fabry-Perot and Bragg filters. Such filters are tuned by mechanically or thermally moving the resonating structure, and the tuning speed is therefore comparatively slow, typically of the order of milliseconds.

Another type of tunable filter is based on the acousto-optic effect. Such components depend on the interaction between an acoustic wave generated in the device, and the optical signal input into the filter. The tuning is achieved by altering the frequency of the acoustic wave, which can be accomplished by altering the frequency of the electronic signal used to generate the acoustic wave. These filters are, however, polarization dependent, which may require correction and cause various other practical problems.

SUMMARY OF THE INVENTION

The present invention advantageously provides a fast tunable optical filter with unique selection means, a reduced form factor (size), and with easier and more efficient operability. The fast tunable optical filter of the present invention is capable of being monolithically integrated on, for example, silica or semiconductive wafers implementing current techniques used for planar lightwave circuit construction.

In one embodiment of the present invention an apparatus includes a waveguide grating router (WGR) for receiving up to P input optical signals and responsively providing up to Q outputs, where P and Q are integers greater than or equal to one, at least one input selecting device for selectively coupling up to P optical signals to the WGR as input signals, and at least one output selecting device for selectively inhibiting up to Q outputs of said WGR. The number of input ports, P, and the number of output ports, Q, of the WGR are determined such that the total number of ports, (P+Q), of said WGR is substantially minimized.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a fast tunable optical filter with unique selection means that can be realized in integrated form with a reduced number of controls. Although the present invention will be described within the context of a fast tunable optical filter comprising specific components, it will be appreciated by those skilled in the art that alternate components performing substantially similar functions can be implemented within the fast tunable optical filter of the present invention in accordance with the present invention.

The purpose of tunable optical filters is to extract one or a subset of optical channels from a multitude of optical channels entering the filter. Additionally, the subset of optical channels extracted can be varied in time by dynamically modifying the filter configuration.

Figure 1:
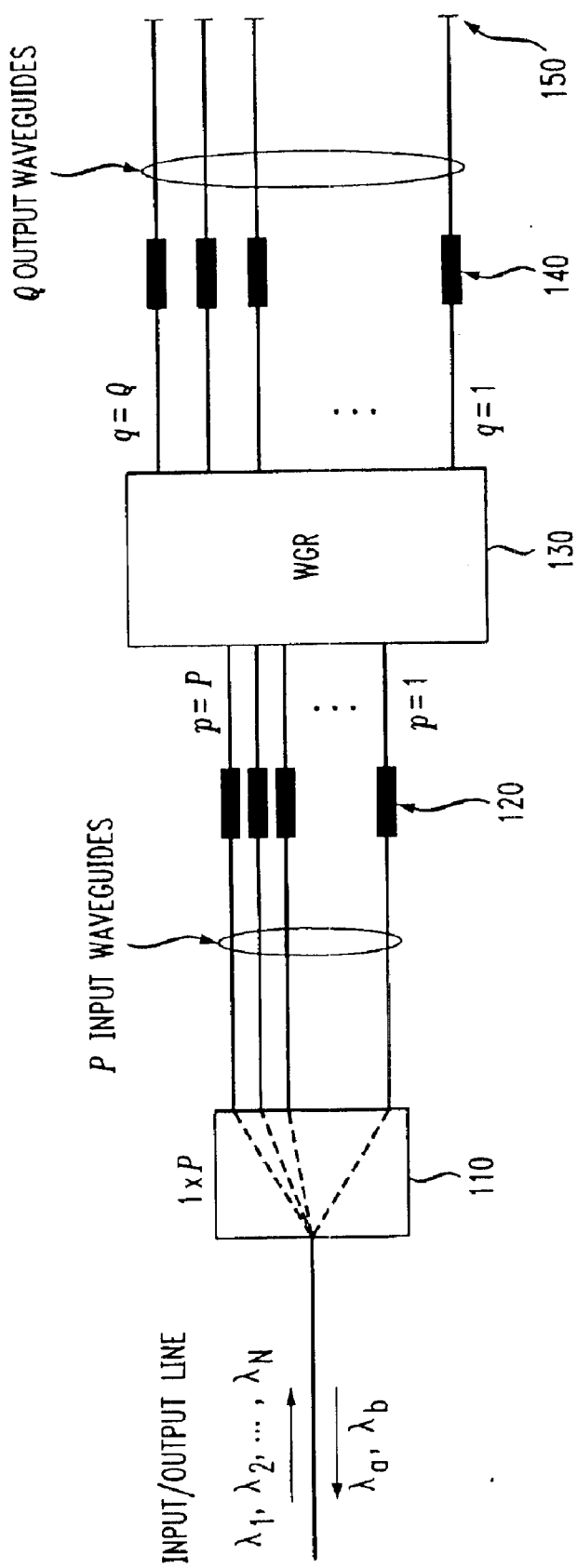
FIG. 1 depicts a high-level block diagram of an embodiment of a fast tunable optical filter in accordance with the present invention.

FIG. 1 depicts a high-level block diagram of an embodiment of a fast tunable optical filter in accordance with the present invention. The fast tunable optical filter 100 of FIG. 1 comprises a power divider 110, a plurality of input shutters $120_1$–$120_n$ (collectively input shutters 120), a frequency routing device (illustratively a waveguide grating router (WGR)) 130, a plurality of output shutters $140_1$–$140_n$ (collectively output shutters 140), and a plurality of reflectors $150_1$–$150_n$ (collectively reflectors 150). The WGR 130 comprises a group of P input waveguides and P input ports (p), and a group of Q output waveguides and Q output ports (q). The power divider 110 and the input shutters 120 comprise an input selection path to the WGR 130. The output shutters 140 and the reflectors 150 comprise an output selection path.

Although in FIG. 1, the components of the fast tunable optical filter 100 were depicted as comprising specific components, it will be appreciated by those skilled in the art that other components performing substantially similar functions can be advantageously implemented within the present invention. For example, in accordance with the present invention, the frequency routing device can also comprise an echelle grating or any other frequency dispersive device in integrated optics or free space optics. The power divider can be a star coupler, a multi-mode interferometer (MMI), a tree of cascaded 1×2 power splitters, or directional couplers; and the shutters can be semiconductor optical amplifiers (SOAs) or Mach-Zender interferometers. The SOAs are absorbing elements as long as no-electrical stimulation is applied, but they become transparent and may even act as optical amplifiers once electrically activated. Once activated, the SOAs can further be used to compensate for a power loss occurring in the fast tunable optical filter of the present invention. Because the shutters are the only active elements of the device, the tuning speed of the fast tunable optical filter 100 is going to be determined by the response time of the shutters, which, in the case of SOAs, is in the order of a few nanoseconds. For silica based devices the most popular shutters take the form of thermally activated Mach-Zehnder interferometers, whose tuning speeds are in the order of hundreds of microseconds.

Briefly stated, an optical signal comprising at least one optical channel comprising light energy at respective spectral regions enters the fast tunable optical filter 100 via an input waveguide and is divided by the power divider 110. Subsequently, the input shutters 120 either block or allow transmission of the power divided optical signal to the WGR 130. The passed optical signals are coupled to the WGR 130 through respective input ports p ($1 \leq p \leq P$) and are switched by the WGR 130 and routed thereby to the output ports q ($1 \leq q \leq Q$) of the WGR 130. The output shutters 140 either block or transmit the switched optical channels from the WGR 130 before reaching the reflectors 150. The reflectors 150 reflect the selected output channels back to the input of the fast tunable optical filter 100. The reflected optical channels can be separated from the incident optical signals by, for example, an optical circulator (not shown).

More specifically, in the fast tunable optical filter 100 of FIG. 1, an optical signal comprising N optical channels with wavelengths $\lambda_k$ (k=1 ... N) is carried by an input waveguide into the power divider 110. A power divider is a passive component with the capability of splitting the input optical power of an optical signal into several outputs. The power divider 110 produces P replicas of the incoming signal. Each replica continues to contain all of the optical channels $\lambda_k$ (k=1 ... N) of the original optical signal, but each replica has an optical power, on average, amounting to approximately 1/P of the original power. Output ports of the power divider 110 provide P inputs to the WGR 130.

A WGR is a planar lightwave circuit comprising P input and Q output ports separated by two slab regions and connected by M waveguides with varying lengths. The inventors have determined that WGRs represent excellent solutions for providing large optical cross-connects. They are fully passive elements and can provide strictly non-blocking connections for a set of N optical channels. In the fast tunable optical filter 100 of FIG. 1, each input port of the WGR 130 is linked to a specific output port by a specific wavelength and each output port of the WGR 130 does not receive the same wavelength more than once from the input ports. The described routing characteristics of the WGR 130 allow for a sequence of optical channels to have one and only one input-output transmission link for each optical channel covered within the spectral range covered by the optical channels $\lambda_k$ (k=1 ... N).

In accordance with the present invention, a combination of a minimum number of input ports and output ports of the WGR 130 provide a route for the optical channels of the input optical signals through the WGR 130. The input ports and the output ports of the WGR 130 are selected to reduce the size of the WGR 130 and subsequently, the fast tunable optical filter 100, and to reduce the power loss of an optical signal through the WGR 130. An inventive method for determining the numbers of input ports and output ports of the WGR 130 and their geometric location on the WGR 130 will be described in detail below.

Referring back to FIG. 1, each input port p of the WGR 130 is controlled by a respective input shutter 120 that can be switched independently of the other input shutters 120. At the output side of the WGR 130, the optical signal switched (filtered) by the WGR 130 propagates through Q outputs. The outputs of the WGR 130 comprise the selected (switched) optical channels of the input optical signals to the WGR 130. Similar to the input side of the WGR 130, each output port q of the WGR 130 is controlled by an output shutter 140, which can also be dynamically and individually controlled into a transmitting or blocking state. The input shutters 120 and the output shutters 140 are elements that are controlled externally and assume either an On-state or an Off-state. In the On-state, a shutter 120, 140 is transparent to the optical flow of the propagating channels. In the Off-state a shutter 120, 140 is opaque and prevents signal transmission. As such, a subset of the incident N optical channels will propagate beyond the output shutters 140 at the WGR 130 output, depending on the combination of input shutters 120 and output shutters 140 in the transmission state. The fast tunable optical filter 100 is able to extract any single optical channel or selected subsets among the N incident optical channels using a minimum number of shutters. The fast tunable optical filter 100 can also select any subset from the incident N optical channels when $P \geq N$ or $Q \geq N$. However, with such a configuration, the total number of shutters to be controlled is not minimal.

In the fast tunable optical filter 100 of FIG. 1, the Q output waveguides are terminated with reflectors 150. The reflectors 150 are used to reflect optical signals transmitted from the output shutters 140 back to the input of the fast tunable optical filter 100. For example, if only one input shutter 130 and one output shutter 140 of the WGR 130 is in the transmitting state, there will be only one optical channel reaching the reflectors, and as such, only one optical channel reflected back to the input of the fast tunable optical filter 100. More generally, the number of transmitted channels is the product between the number of input shutters in the transmitting state and the number of output shutters in the transmitting state.

The inventors have developed an inventive method for determining the number of inputs, P, and the number of outputs, Q, for the WGR 130 that minimizes the number of controllers (i.e., input shutters 120 and output shutters 140) necessary to perform the channel selecting function of the fast tunable optical filter 100. Solving for the solution that minimizes the sum P+Q is advantageous because, as such, the number of input shutters 120 and output shutters 140 to be controlled at the input and output ports of the WGR 130 is minimized. When the number of controllers required in the WGR 130 results in a reduction of both the form factor (size) of the WGR 130 and the size of the fast tunable optical filter 100, and ultimately increases the yield and manufacturability of the device resulting in a cost reduction.

The routing properties of a WGR with P input ports and Q output ports allow for P×Q possible connections and, because in the present invention each connection is associated with a unique optical channel (wavelength), P×Q must be larger or equal to N if N optical channels have to be supported by the WGR. As such, $N \leq P \times Q$, where N is the number of optical channels to be supported by a WGR, P is the number of input ports of the WGR, and Q is the number of output ports of the WGR.

For any real number $Z=W\times Y$, the minimum sum $W+Y$ is obtained when $W=Y=\sqrt{Z}$ (this follows by computing the derivative $$\frac{d}{dW}\left(W+\frac{Z}{W}\right)=0)$$

such that $W+Y=2\sqrt{Z}$. As such, for any other combination of W, Y the sum $W+Y$ will not be minimal. Furthermore, for any $Z^*>Z$, the minimum sum $W^*+Y^*=2\sqrt{Z^*}>2\sqrt{Z}$. In the integer domain, for any integer $B>A$ (where integer $A=C^2$, C being an integer), the minimum of the sum $b_1+b_2$ (with $b_1\times b_2=B$) is larger than the minimum of the sum $a_1+a_2$ (with $a_1\times a_2=A$). As such, the minimum sum $a_1+a_2=2C$. Also, for any $B>A$, the integer minimum sum $b_1+b_2 \geq 2\sqrt{B}>2C$.

Using the above concepts for the case of evenly spaced optical channels $\lambda_k$, the minimum total number of shutters $P+Q$ is determined from the solutions of the equation (1) as follows:

$$N \leq P\times Q \leq [CEIL(\sqrt{N})]^2 \quad (1)$$

where the ceiling function, CEIL, denotes the next higher integer for a non-integer argument and CEIL(x)=x for an integer x, P is the number of input ports of the WGR, and Q is the number of output ports of the WGR. The right hand side of equation (1) above is the next higher integer that can be found after N and that can be expressed as $C^2$ (C being an integer). Therefore if no product $P\times Q$ (where $N \leq P\times Q < [CEIL(\sqrt{N})]^2=C^2$) has $P+Q<2C$, then the minimum sum will be $P+Q=2C$ and $P=Q=C$ for the reasons stated above. Equation (1) restricts to a finite number of pairs (P,Q) among which the solution for the minimum sum $P+Q$ has to be found. This greatly speeds up the search for the optimum solutions for the number of input ports, P, of the WGR and the number of output ports, Q, of the WGR. Once the solution pairs (P,Q) have been determined for the WGR, a power loss associated with a power splitter (such as the power splitter 110 of FIG. 1) is minimized by selecting $P \leq Q$.

For unevenly spaced optical channels, the determination of the minimum number of input ports, P, of the WGR and the number of output ports, Q, of the WGR is more complex because the number of ports of the WGR strongly depends on how the channels are individually positioned across the spectrum. The minimum total number of input ports and output ports of the WGR, $P+Q$, is determined from the equations as follow:

$$N^* \leq P\times Q \leq [CEIL(\sqrt{N^*})]^2 \quad (2)$$

where $$N^* = \frac{\text{Max}\{\lambda_k\}-\text{Min}\{\lambda_k\}}{LCF\{(\lambda_j - \lambda_l)\}}+1 \quad \forall k, j, l = 1 \ldots N. \quad (3)$$

As in equation (1) above, in equation (2) the ceiling function, CEIL, denotes the next higher integer for a non-integer argument and CEIL(x)=x for an integer x, P is the number of input ports of the WGR, and Q is the number of output ports of the WGR.

In equation (3) above, the Max and Min functions denote the maximum and minimum wavelength values, respectively, of the optical channels, $\lambda_k$ (k=1 ... N), and LCF denotes the largest common factor among the wavelength differences $(\lambda_j-\lambda_l)$ between the N optical channels for j, l=1 ... N. The values of $\lambda_k$ (k=1 ... N) can be adjusted to ensure that the LCF function does not become too small and consequently $N^*$ too large. If $N^*$ is not an integer, $N^*$ will have to be rounded to the next higher integer. It should be noted that if the wavelengths $\lambda_k$ (k=1 ... N) are equally spaced then $N=N^*$. As with the case of evenly spaced channels, solving for the solution that minimizes the sum $P+Q$ is necessary to minimize the number of input and output ports of the WGR 130 to be controlled. As in the case of evenly spaced channels, once the solution pairs (P,Q) have been determined, the power loss due to a power splitter is minimized by selecting $P \leq Q$.

It should be noted though, that although equations (2) and (3) above always generate a solution for the sum $P+Q$, the solution does not always depict a minimum for the number of input ports, P, and the number of output ports, Q. An alternative method to obtain a smaller sum of $P+Q$ consists of splitting the total number of optical channels (wavelength sequence) into subsequences each one with a constant channel separation. The method described above and applied for equally spaced channels is then applied to each subsequence separately. For both cases, for evenly and unevenly spaced channels, the minimum sum of the number of input ports, P, and the number of output ports, Q, follows the relation $P+Q \leq N+1$.

Figure 2:
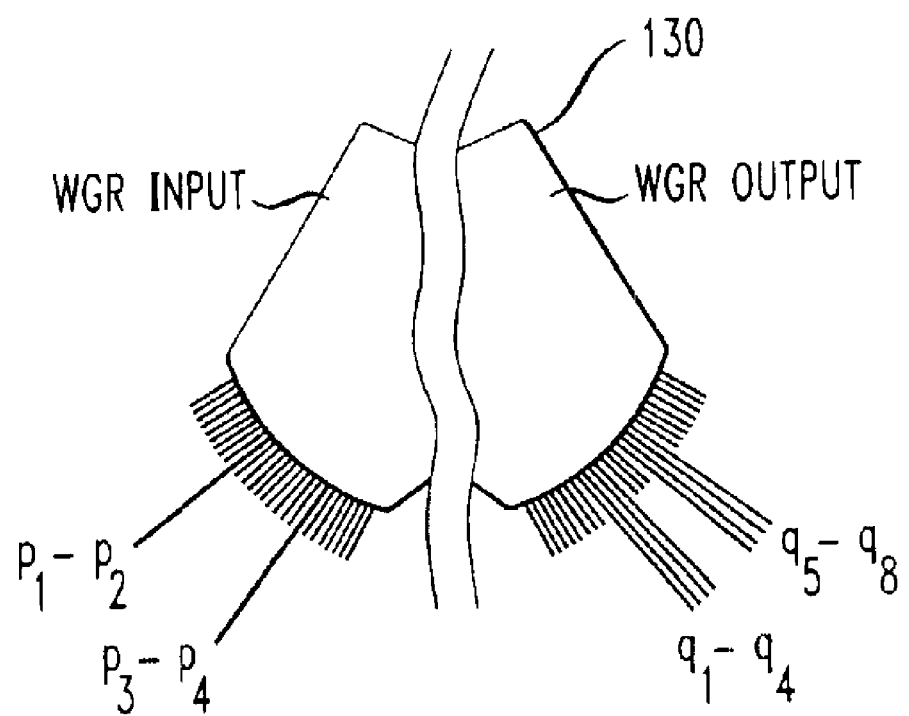
FIG. 2 depicts a high level diagram of the location of the input ports and the output ports of the waveguide grating router of FIG. 1.

Once the number of inputs, P, and outputs, Q, for a WGR are determined, a geometric location for the input ports $p_j$ (j=1 ... P), and the output ports $q_h$ (h=1 ... Q) of the WGR must be determined so as to reduce a power loss and enhance the loss uniformity associated with the WGR. FIG. 2 depicts a high level diagram of a location of the input ports $p_j$ and the output ports $q_j$ of the WGR 130 of FIG. 1130 in an example where N=32 for evenly spaced channels. Solving for the number of input ports, P, and the number of output ports, Q, of the WGR 130 in accordance with the present invention and as described above, the solution for P and Q and is determined as $N=32=P\times Q=4\times 8$. To minimize the power loss due to the power splitter 110 of FIG. 1, the number of input ports, P, and the number of output ports, Q, for the WGR 130 were chosen such that P<Q. As such, the number of input ports, P, of the WGR 130 is equal to 4 and the number of output ports, Q, for the WGR 130 is equal to 8.

By locating the input ports $p_1$–$p_4$ and the output ports $q_1$–$q_8$ as close to the center of the Brillouin zone as possible, the loss uniformity among the ports is optimized. As such, a power loss associated with the function of the WGR 130 in the fast tunable optical filter 100 is reduced. The imaging properties of the WGR 130 behave in a manner such that, the more closely spaced the input ports, the larger the spacing between the output ports needs to be when all N channels are correctly accomodated.

Therefore, by increasing the distance between the input ports, the output ports will move closer. This procedure is iterated until the total span covered by the input ports $p_j$ approximately equals the total span covered by the output ports $q_h$. In such a manner, the most central part of the Brillouin zone is used allowing for optimized transmission loss and loss uniformity across the WGR 130. The improved performance of a FRD (illustratively a WGR) in accordance with the present invention is further advantageous in that it decreases the operating losses of a fast tunable optical filter. As such, the fabrication tolerances can be relaxed resulting in a manufacturing yield increase and cost reductions.

Figure 3:
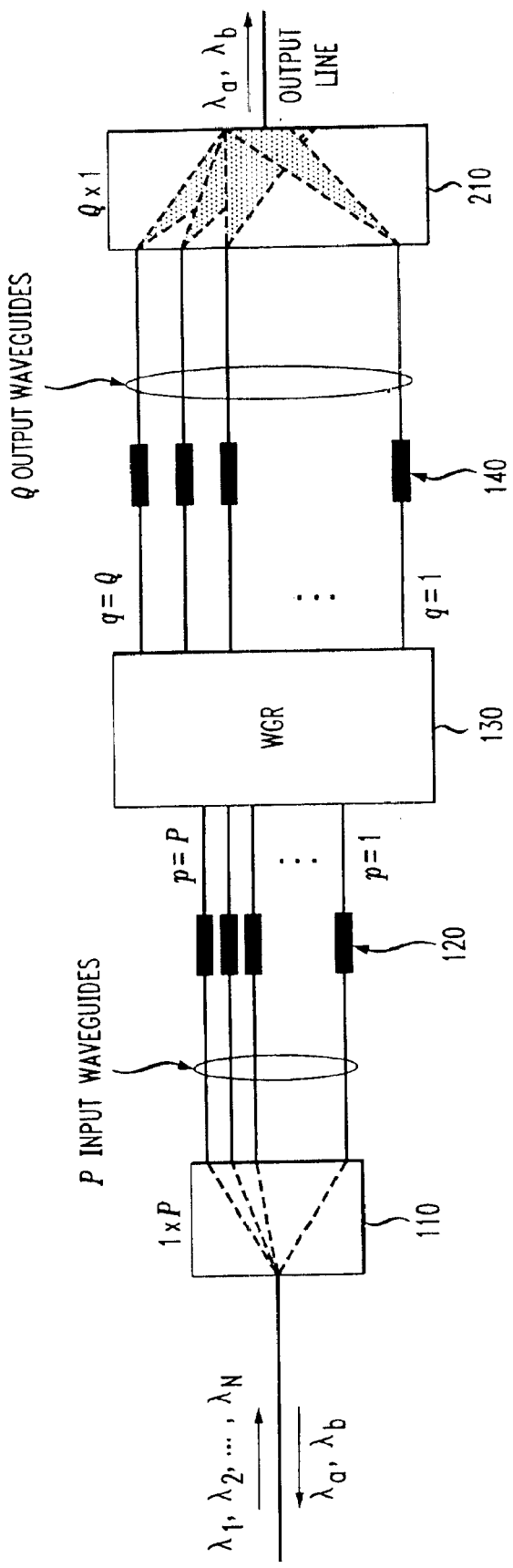
FIG. 3 depicts a high-level block diagram of an alternate embodiment of the fast tunable optical filter of FIG. 1.

FIG. 3 depicts a high-level block diagram of an alternate embodiment of the fast tunable optical filter 100 of FIG. 1.

The fast tunable optical filter 200 of FIG. 3 comprises a power divider 110, a plurality of input shutters $120_1$–$120_n$ (collectively input shutters 120), a frequency routing device (illustratively a waveguide grating router (WGR)) 130, a plurality of output shutters $140_1$–$140_n$ (collectively output shutters 140), and a power combiner 210. The WGR 130 comprises a group of P input waveguides and P input ports, and a group of Q output waveguides and Q output ports. The power divider 110 and the input shutters 120 comprise an input selection path to the WGR 130. The output shutters 140 and the power combiner 210 comprise an output selection path.

The fast tunable optical filter 200 of FIG. 3 is substantially identical to the fast tunable optical filter 100 of FIG. 1 with the exception of the reflectors 150 in the fast tunable optical filter 100 of FIG. 1. Instead of terminating the Q output waveguides with reflectors 150, the Q output waveguides are configured to form the Q input ports of a Q×1 device (illustratively a Q×1 power combiner) 210. This embodiment converts the fast tunable optical filter of FIG. 1 from a total reflection optical filter to a one-way optical filter.

Figure 4:
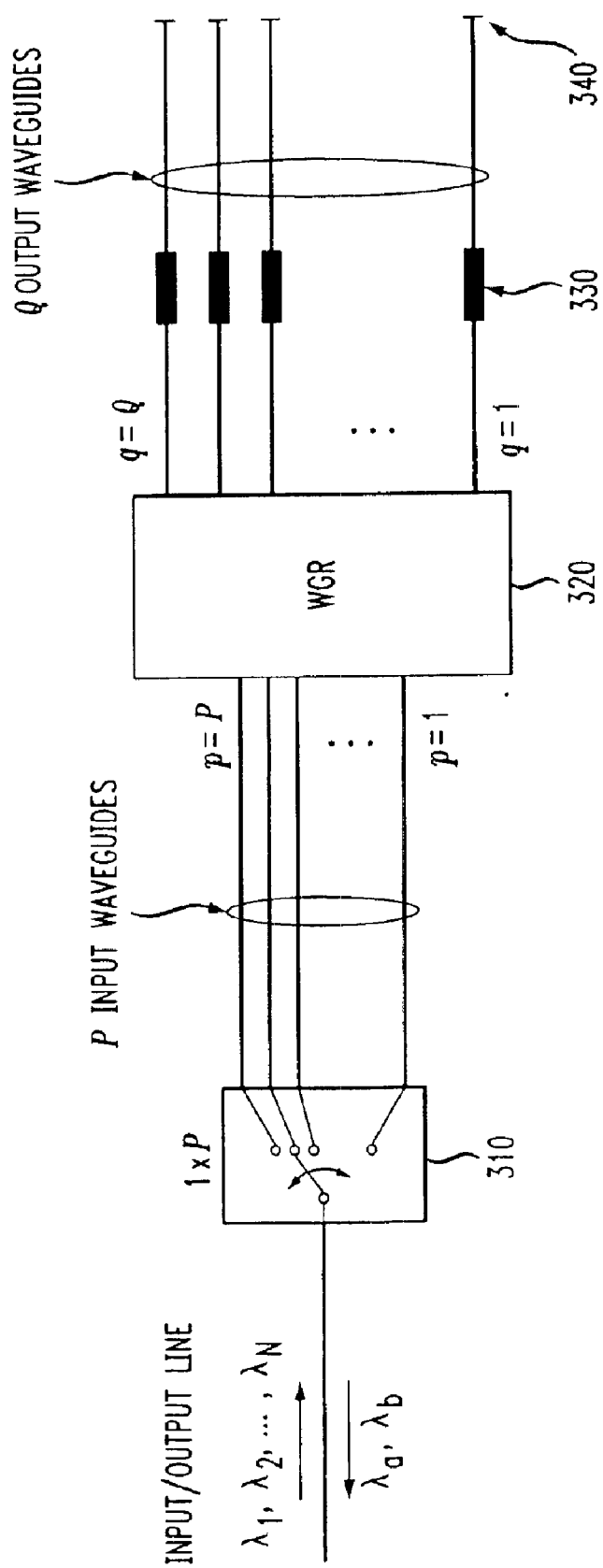
FIG. 4 depicts a high-level block diagram of an alternate embodiment of a fast tunable optical filter in accordance with the present invention.

FIG. 4 depicts a high-level block diagram of an alternate embodiment of a fast tunable optical filter in accordance with the present invention. In FIG. 4, the fast tunable optical filter 100 of FIG. 1 is modified by replacing the power divider 110 and the input and output WGR shutters 120, 140 with a spatial switch 310. In the fast tunable optical filter 300 of FIG. 4, the spatial switch 310 comprises an input selection path. The fast tunable optical filter 300 of FIG. 4 comprises a spatial switch 310, a frequency routing device (illustratively a waveguide grating router (WGR)) 320, a plurality of output shutters $330_1$–$330_n$ (collectively output shutters 330), and a plurality of reflectors $340_1$–$340_n$ (collectively reflectors 340). The WGR 320 comprises a group of P input waveguides and P input ports, and a group of Q output waveguides and Q output ports. As in the case of the fast tunable optical filter 100 of FIG. 1, the components of the fast tunable optical filter 300 of FIG. 4 can be monolithically integrated on silica or semiconductive wafers and may be constructed by known photolithographic techniques. For example the spatial switch can be implemented through multimode interference couplers (MMIs) in series connected by arms, each one controlled by a tunable phase shifter, or a tree of cascaded power switches based on digital switches or 2×2 Mach-Zehnder interferometers, and the shutters can be semiconductor optical amplifiers (SOAs). The SOAs are absorbing elements as long as no electrical stimulation is applied, but they become transparent and even act as optical amplifiers once activated. Once activated, the SOAs can further be used to compensate for a power loss occurring in the fast tunable optical filter of the present invention. The response of the SOAs is in the order of a few nanoseconds.

In the fast tunable optical filter 300 of FIG. 4, N optical channels with wavelength $\lambda_k$ (k=1 . . . N) are carried by an input waveguide into the spatial switch 310. The spatial switch 310 directs the optical channels towards one of a plurality of output ports available within the spatial switch 310. The directed optical channel output from the spatial switch is directed for a specific and determined input port of the WGR 320. The directed optical signal continues to contain all of the channels $\lambda_k$ (k=1 . . . N), and all of the optical power. Unlike a passive power divider, the spatial switch 310 requires active control. As such, the output port of the spatial switch 310 is selected by a user. Output ports of the spatial switch 310 provide one input (p) at a time to the WGR 320. For example, once a channel wavelength to be transmitted has been selected, and thus the link (p,q) with the WGR 320 determined, the spatial switch 310 has to be configured to direct the incident optical channels to the desired input port (p) of the WGR 320. The output shutter 330 controlling the output (q) of the WGR 320 corresponding to the selected channel wavelength is then configured for the On-state. As only one input port (p) of the WGR 320 can be accessed at a time, the number of channel subsets that can be selected from the N available input channels is reduced. In one embodiment of the present invention, the operation of integrated spatial switches is based on a tree of controllable 1×2 switches such as power dividers, and the like. In this manner, it is possible to select which one(s) and how many among the output ports of the spatial switch 310 can be simultaneously accessed.

The number of inputs and outputs to the WGR 320 of the fast tunable optical filter 300 of FIG. 4 are determined in substantially the same manner as described above for the fast tunable optical filter 100 of FIG. 1.

In the fast tunable optical filter 300 of FIG. 4, the output shutters 330 either block or transmit the switched optical channels from the WGR 320 before reaching the reflectors 340. As described above, only an output shutter 330 controlling the output (q) of the WGR 320 corresponding to the selected channel wavelength is configured for the On-state. The outputs (q) of the WGR 320 propagate through Q output waveguides. The Q output waveguides are terminated with the reflectors 340. The reflectors 340 reflect the selected output channel back to the input of the fast tunable optical filter 300.

Figure 5:
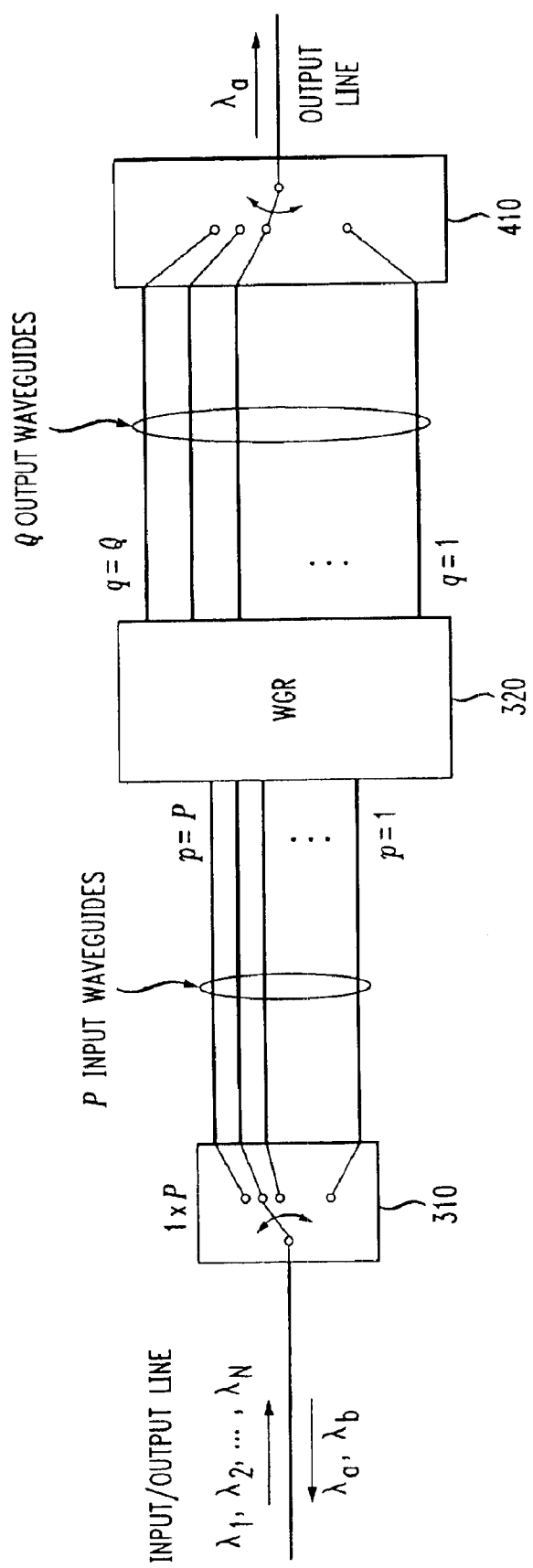
FIG. 5 depicts a high-level block diagram of an alternate embodiment of the fast tunable optical filter of FIG. 4.

FIG. 5 depicts a high-level block diagram of an alternate embodiment of the fast tunable optical filter of FIG. 4. The fast tunable optical filter 400 of FIG. 5 is substantially identical to the fast tunable optical filter 300 of FIG. 4 with the exception of the reflectors 340 and the output shutters 330. Instead of terminating the Q output waveguides with reflectors 340, the Q output waveguides are configured to form the Q input ports of a Q×1 device (illustratively a Q×1 spatial switch) 410. The use of the spatial switch 410 as an output device removes the need for output shutters at the outputs of the WGR 320 because the selection of the WGR output port (q) is accomplished by the spatial switch 410. Additionally, the fast tunable optical filter 400 of FIG. 5 comprises a distinct input port and output port. This converts the fast tunable optical filter of the present invention from a total reflection optical filter to a one-way optical filter.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. An optical filter for selectively passing at least one optical channel of input optical signals, comprising:
    a frequency routing device (FRD) for receiving up to P input optical signals and responsively providing up to Q outputs for each of said P input optical signals, where P and Q are integers greater than or equal to one;
    at least one input selecting device for selectively coupling up to P input optical signals to said FRD; and
    at least one output selecting device for selectively inhibiting up to Q outputs from said FRD;
    wherein the number of input ports, P, and the number of output ports, Q, of said FRD are determined such that the total number of ports, (P+Q), of said FRD is substantially minimized.

2. The optical filter of claim 1, wherein the number of input ports, P, and the number of output ports, Q, are determined using the equation:

$$N^* \leq P \times Q \leq [\text{CEIL}(\sqrt{N^*})]^2,$$

wherein $$N^* = \frac{\text{Max}\{\lambda_k\} - \text{Min}\{\lambda_k\}}{\text{LCF}\{(\lambda_j - \lambda_l)\}} + 1 \quad \forall k, j, l = 1 \ldots N,$$

wherein the CEIL function determines the next higher integer for a non-integer argument, N is the number of optical channels in each of said input optical signals, $\lambda_k$ is the wavelength of an input optical channel, the Max and Min functions denote the maximum and minimum wavelengths of said optical channels, and LCF denotes the largest common factor among the wavelength differences $(\lambda_j - \lambda_l)$ between said optical channels.

3. The optical filter of claim 2, wherein the number of input ports, P, and the number of output ports, Q, are substantially minimized and result in a reduced form factor of said FRD.

4. The optical filter of claim 1, wherein said input optical signals each comprise a number of optical channels.

5. The optical filter of claim 4, wherein said number of optical channels is equal to P×Q.

6. The optical filter of claim 1, wherein said FRD is a waveguide grating router (WGR).

7. The optical filter of claim 1, wherein said at least one input selecting device comprises up to P input shutters, each of said P input shutters operative to selectively pass a respective optical signal to said FRD.

8. The optical filter of claim 1, wherein said at least one output selecting device comprises up to Q output shutters, each of said Q output shutters operative to selectively inhibit a respective output from said FRD.

9. The optical filter of claim 1, further comprising at least one reflective device for reflecting a transmitted output from said FRD back toward a respective input port of said FRD.

10. The optical filter of claim 1, further comprising a Q×1 combiner for combining the transmitted outputs.

11. The optical filter of claim 1, wherein said at least one input selecting device comprises at least one spatial switch operative to selectively pass an optical signal to said FRD.

12. The optical filter of claim 11, wherein said at least one output selecting device comprises at least one spatial switch operative to selectively pass an output from said FRD.

13. The optical filter of claim 1, wherein each input port is linked to an output port through only one optical channel and each of said output ports does not receive the same optical channel from different ones of said input ports.

14. The optical filter of claim 6, wherein the input ports and the output ports are positioned close to the center of respective Brillouin zones to optimize the loss uniformity among the ports.

15. An apparatus comprising:
a frequency routing device (FRD) for receiving up to P input optical signals and responsively providing up to Q outputs, where P and Q are integers greater than or equal to one;
at least one input selecting device for selectively coupling up to P input optical signals to said FRD; and
at least one output selecting device for selectively inhibiting up to Q outputs from said FRD;
wherein the number of input ports, P, and the number of output ports, Q, of said FRD are determined by calculating the minimum of the following function:

$$f(P,Q) = P + Q$$

defined over the interval $$N^* \leq P \times Q \leq [\text{CEIL}(\sqrt{N^*})]^2,$$

and wherein $$N^* = \frac{\text{Max}\{\lambda_k\} - \text{Min}\{\lambda_k\}}{\text{LCF}\{(\lambda_j - \lambda_l)\}} + 1 \quad \forall k, j, l = 1 \ldots N,$$

wherein the CEIL function determines the next higher integer for a non-integer argument, N is the number of optical channels in each of said input optical signals, $\lambda_k$ is the wavelength of an input optical channel, the Max and Min functions denote the maximum and minimum wavelengths of said optical channels, and LCF denotes the largest common factor among the wavelength differences $(\lambda_j - \lambda_l)$ between said optical channels.

16. The apparatus of claim 15, wherein the number of input ports, P, and the number of output ports, Q, are substantially minimized and result in a reduced form factor of said FRD.

17. The apparatus of claim 15, wherein said input optical signals each comprise a number of optical channels.

18. The apparatus of claim 17, wherein said number of optical channels is equal to P×Q.

19. The apparatus of claim 15, wherein said FRD is a waveguide grating router (WGR).

20. The apparatus of claim 15, wherein said at least one input selecting device comprises up to P input shutters, each of said P input shutters operative to selectively pass a respective optical signal to said FRD.

21. The apparatus of claim 15, wherein said at least one output selecting device comprises up to Q output shutters, each of said Q output shutters operative to selectively inhibit a respective output from said FRD.

22. The apparatus of claim 15, further comprising at least one reflective device for reflecting a transmitted output from said FRD back toward a respective input port of said FRD.

23. The apparatus of claim 15, further comprising a Q×1 combiner for combining the transmitted outputs.

24. The apparatus of claim 15, wherein said at least one input selecting device comprises at least one spatial switch operative to selectively pass an optical signal to said FRD.

25. The apparatus of claim 24, wherein said at least one output selecting device comprises at least one spatial switch operative to selectively pass an output from said FRD.

26. The apparatus of claim 15, wherein each input port is linked to an output port through only one optical channel and each of said output ports does not receive the same optical channel from different ones of said input ports.

27. The apparatus of claim 19, wherein the input ports and the output ports are positioned close to the center of respective Brillouin zones to optimize the loss uniformity among the ports.

* * * * *